US006730897B2

(12) United States Patent
Guidash

(10) Patent No.: US 6,730,897 B2
(45) Date of Patent: May 4, 2004

(54) LINEARITY AND DYNAMIC RANGE FOR COMPLEMENTARY METAL OXIDE SEMICONDUCTOR ACTIVE PIXEL IMAGE SENSORS

(75) Inventor: Robert M. Guidash, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 213 days.

(21) Appl. No.: 09/750,745

(22) Filed: Dec. 29, 2000

(65) Prior Publication Data

US 2002/0121589 A1 Sep. 5, 2002

(51) Int. Cl.⁷ .............................................. H01L 27/00
(52) U.S. Cl. .................................................. 250/208.1
(58) Field of Search ........................ 250/208.1, 214.1, 250/214 R; 257/291, 292; 348/302–314, 294–299

(56) References Cited

U.S. PATENT DOCUMENTS 5,614,744 A * 3/1997 Merrill ...................... 257/291
6,344,877 B1 * 2/2002 Gowda et al. ............... 348/245
6,384,394 B1 * 5/2002 Afghahi ..................... 250/208.1

* cited by examiner

Primary Examiner—Tu T. Nguyen
(74) Attorney, Agent, or Firm—Peyton C. Watkins

(57) ABSTRACT

A method and structure for a complementary metal oxide semiconductor active pixel sensor device having a photodetector, a sensing node electrically connected to the photodetector, an output connected to the photodetector, and a voltage-independent capacitance device connected between the sensing node and the output. The voltage-independent capacitance device provides a capacitance independently of a voltage on the sensing node. The voltage-independent capacitance device can be a voltage-independent capacitor, an electrode-electrode capacitor, or a common source amplifier and should have a capacitance larger than the capacitance of the sensing node. The voltage-independent capacitance device lowers an overall voltage-dependent capacitance of the APS.

11 Claims, 4 Drawing Sheets

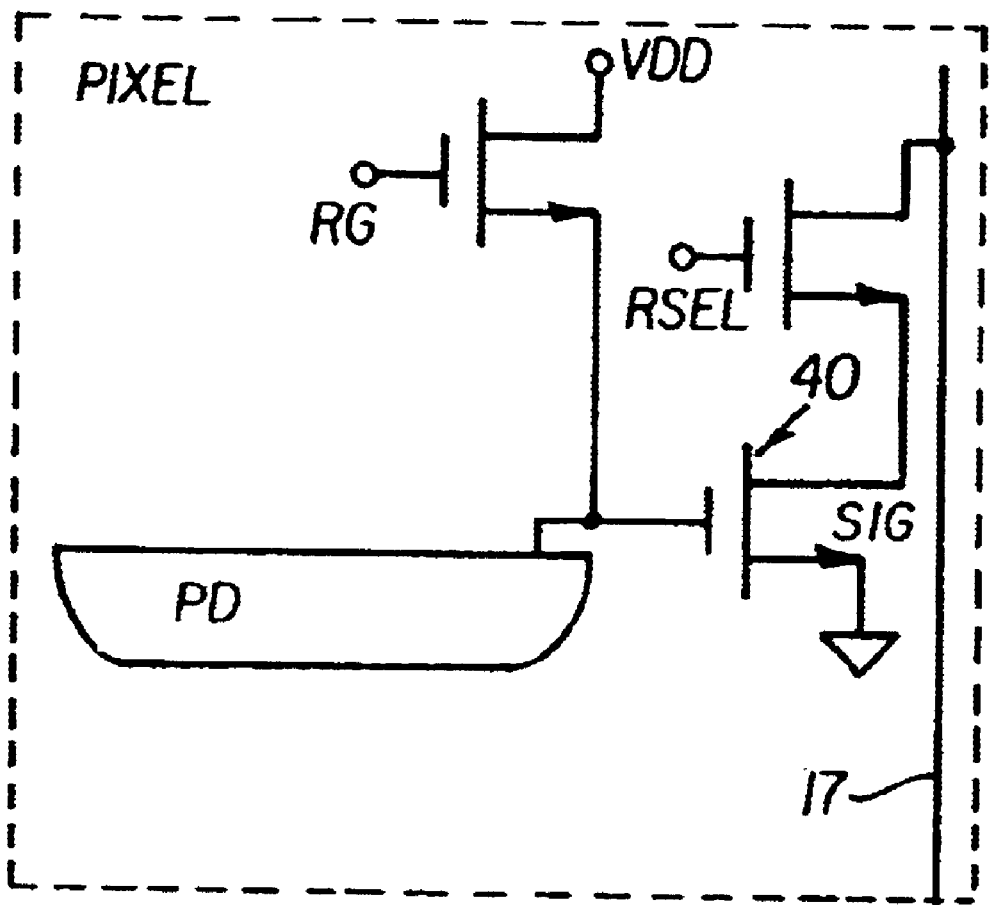
FIG. 5b
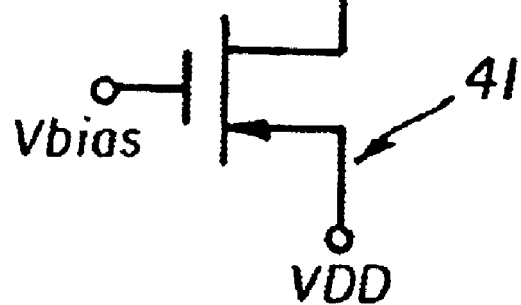

LINEARITY AND DYNAMIC RANGE FOR COMPLEMENTARY METAL OXIDE SEMICONDUCTOR ACTIVE PIXEL IMAGE SENSORS

FIELD OF THE INVENTION

The present invention generally relates to complementary metal oxide semiconductor (CMOS) active pixel sensors (APS) and more particularly to an improved pixel sensor that has increased linearity as a result of additional voltage-independent capacitance.

BACKGROUND OF THE INVENTION

CMOS APS are solid state imagers where each pixel contains a photo-sensing means, reset means, charge conversion means, select means, and all or part of an amplifier. APS devices have the advantages of single supply operation, lower power consumption, x-y addressability, image windowing, and the ability to effectively integrate signal processing electronics on-chip, when compared to CCD sensors.

In order to build high resolution, small pixel APS devices for digital cameras it is necessary to use sub-$\mu$m CMOS processes in order to minimize the area of the pixel allocated the active components in each pixel. In order to achieve good signal to noise performance it is important to hold as many photoelectrons as possible within the pixel. In typical APS pixel architectures the integrated photoelectrons are converted to a voltage in each pixel. This charge to voltage conversion region is typically a diode, either the photodiode or an isolated floating diffusion. It is the parasitic capacitance of the charge to voltage conversion region that determines the maximum number of electrons that can be contained within the region. Sub-$\mu$m CMOS processes are typically operated at low supply voltages, 3.3V and below, hence the reset level and the voltage swing that can be accommodated in the charge to voltage conversion region is limited by the supply voltage. Since the supply voltage is low, the signal swing on the charge to voltage conversion region is a large compared to the reset level. Since the capacitance of the diode that forms the charge to voltage conversion region is a function of the voltage across the diode, and the signal swing is large compared to the total voltage across the diode at reset, the capacitance of the diode changes substantially from the reset level, (or dark signal), to the saturation level, (or bright signal). In typical APS pixel architectures the capacitance at reset is smaller than the capacitance at saturation. This produces a non-linear transfer function. It is very important to have a linear transfer function for color image sensors. Non-linearity in the sensor response can degrade the color fidelity of the image. Response linearity has been optimized for CCD image sensors. APS are much less linear that CCD's.

In addition to poor linearity, APS sensors can also suffer from low charge capacity as a result of the reduced supply voltages in sub-$\mu$m CMOS processes. For the same pixel size, CMOS APS sensors have lower charge capacity compared to CCD image sensors due to the larger supply and clock voltages used on CCD image sensors.

One approach to providing an image sensor with the linearity of a CCD and the advantages of an APS device is to reduce the effect of the voltage dependent capacitance of the charge to voltage conversion region of an APS device. This invention does so by providing a voltage independent capacitor in parallel with the diode capacitance of the charge to voltage conversion region. This can also be used to improve the charge capacity of an APS device.

SUMMARY OF THE INVENTION

It is, therefore, an object of the present invention to provide a structure and method for a complementary metal oxide semiconductor active pixel sensor device having a photodetector, a charge to voltage conversion node, an amplifier input connected to the charge to voltage conversion node, and a voltage-independent capacitance connected in parallel with the charge to voltage conversion node. The voltage-independent capacitance provides a capacitance that is not a function of charge placed on the charge to voltage conversion node. The voltage-independent capacitance can be an electrode-electrode capacitor, or the input capacitance of an amplifier.

The invention also comprises a method of manufacturing a complementary metal oxide semiconductor active pixel sensor device which includes a photodetector, a charge to voltage conversion node, an amplifier input connected to the charge to voltage conversion node, and a voltage-independent capacitance connected in parallel with the charge to voltage conversion node. The voltage-independent capacitance provides a capacitance that is not a function of charge placed on the charge to voltage conversion node. The voltage-independent capacitance can be an electrode-electrode capacitor, or the input capacitance of an amplifier.

BRIEF DESCRIPTION OF THE DRAWINGS

The foregoing and other objects, aspects and advantages will be better understood from the following detailed description of a preferred embodiment of the invention with reference to the drawings, in which:

FIG. 5b is a schematic diagram of an active pixel sensor pixel utilizing a common source amplifier.

DETAILED DESCRIPTION OF THE INVENTION

Figure 1:
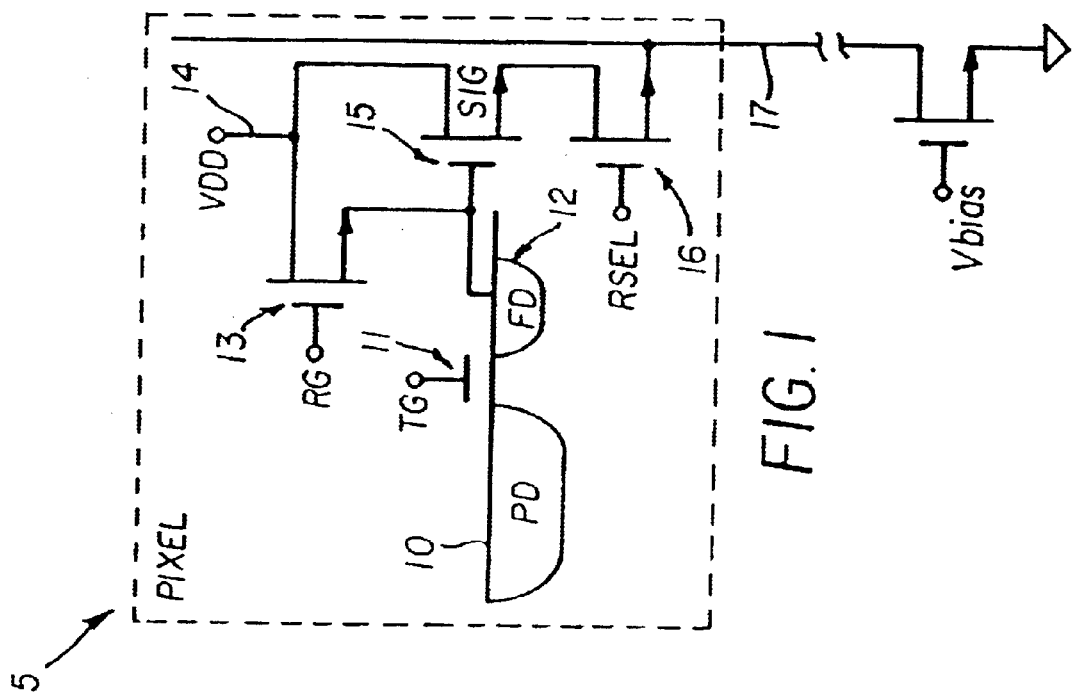
FIG. 1 is a schematic diagram of an active pixel sensor pixel.

FIG. 1 is a schematic diagram that illustrates a CMOS APS pixel 5. As shown in FIG. 1, the cell 5 includes a photodiode 10, a transfer transistor 11 with a transfer gate TG, whose source is connected to the photodiode, and a reset transistor 13 with a reset gate RG, whose drain is connected to the voltage supply VDD 14. The drains of the transfer transistor 11 and the source of the reset transistor 13 form a floating diffusion region FD 12 which functions as a charge to voltage conversion node. The floating diffusion region 12 is connected to the gate of the input transistor 15 of a source follower amplifier. The source of the input transistor 15 is connected to the drain of the row select transistor 16, and the source of row select transistor 16 is connected to the column bus 17.

Operation of active pixel sensor cell 5 is performed in three steps: a reset step, where cell 10 is reset from the previous integration cycle; an image integration step, where the light energy is collected and converted into an electrical signal; and a signal readout step, where the signal is read out.

Referring to FIG. 1, during the reset step, the gate of reset transistor 13, and transfer transistor 11 is briefly pulsed with a reset voltage (e.g. 3.3 volts). The reset voltage turns on reset transistor 13 and transfer transistor 11 which pulls up the voltage on photodiode 10, and floating diffusion region 12 to an initial reset voltage.

Now the integration phase can commence. During integration, light energy, in the form of photons, strikes photodiode 10, thereby creating a number of electron-hole pairs. Photodiode 10 is designed to limit recombination between the newly formed electron-hole pairs. As a result, the photo-generated holes are attracted to the ground terminal of photodiode 10, while the photo-generated electrons are attracted to the positive terminal of photodiode 10 where each additional electron reduces the voltage on photodiode 10. Thus, at the end of the integration step, the potential on photodiode 10 will have been reduced to a final integration voltage where the amount of the reduction represents the intensity of the received light energy.

Following the image integration period, the readout period commences. First row select transistor 16 is turned on by applying a select voltage, (e.g. 3.3 volts) to the gate of row select transistor 16. Next the gate of reset transistor 13, is briefly pulsed with a reset voltage (e.g. 3.3 volts). The reset voltage turns on reset transistor 13 which pulls up the voltage on floating diffusion 12 to an initial reset voltage, typically less than or equal to VDD minus the reset transistor threshold voltage. At this point the depletion region of the floating diffusion is at its maximum level and consequently the capacitance of the floating diffusion is at a minimum level. The floating diffusion reset voltage on the gate of source of source-follower transistor 15 is then read out as a reset voltage level. Next the integrated photo-electrons are transferred from the photodetector to the floating diffusion by pulsing the gate of transfer transistor 11. This reduces the voltage on the floating diffusion 12. The floating diffusion signal voltage on the gate of source-follower transistor 15 is then read out as a signal voltage level. The signal and reset levels are then subtracted providing a voltage which represents the total charge collected by cell 5.

The maximum number of photo-electrons or maximum signal level typically reduces the floating diffusion voltage level by an amount that is all of, or a large percentage of the reset voltage on the floating diffusion. As a result, the floating diffusion depletion region width changes by a substantial amount compared to the initial depletion region width after reset. This produces a variable floating diffusion capacitance that is a function of the number of photo-electrons transferred to the floating diffusion. As the number of electrons transferred increases, the floating diffusion depletion region width decreases and the floating diffusion capacitance increases. This produces a continuously non-linear transfer function.

Figure 3:
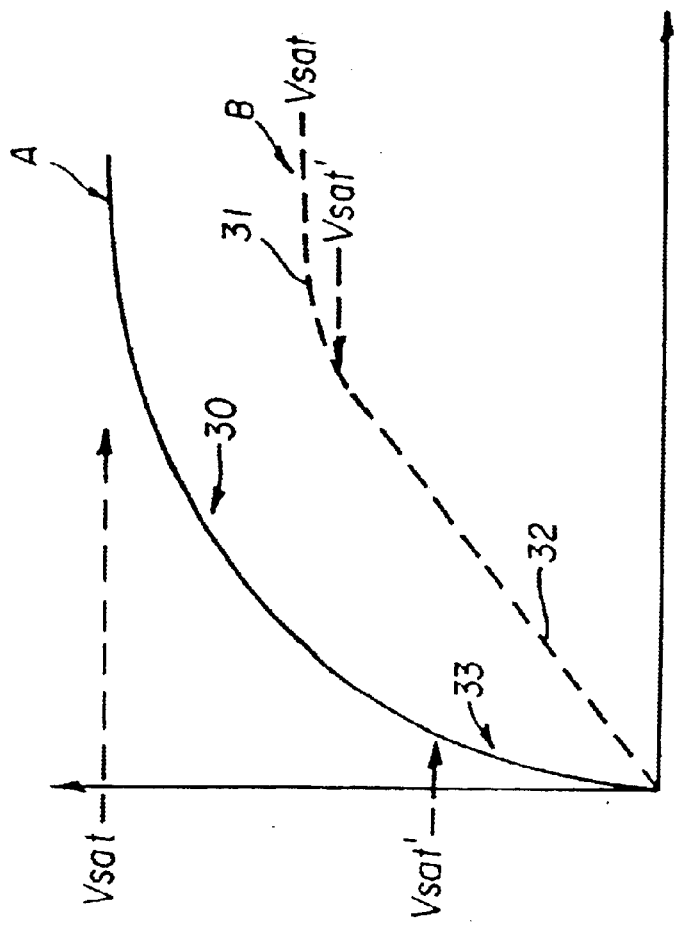
FIG. 3 is a graph illustrating the linearity of voltage output by active pixel sensor pixels shown in FIGS. 1 and 2.

The linearity problems created by voltage-dependent capacitance are illustrated in FIG. 3. The vertical axis in FIG. 3 represents the voltage of the floating diffusion region 12 while the horizontal axis represents the light level or integration time. The number of photo-electrons that are collected vs. light level or integration time is a linear relationship. However, since the floating diffusion capacitance increases as a function of the number of photo-electrons collected, the output signal provided to the column bus 17 from the floating diffusion region vs. light level or integration time is not a linear relationship.

This relationship can be seen in the solid line A of FIG. 3. More specifically, line A represents a continuously non-linear transfer function. This line has a continuously negative second derivative. Line A has a useable signal range 33 up to the voltage level Vsat', based upon a certain percentage deviation from a linear transfer function. This is can be much less than the total signal swing Vsat. While the amount of light energy (e.g., photons) received along the second portion 30 of the response line can be calculated, such calculations can result in higher noise in the rendered image. Therefore, for high image quality applications, the APS pixel output is only used for voltages along the first portion of 33 and not generally utilized for voltages above Vsat'.

Figure 2:
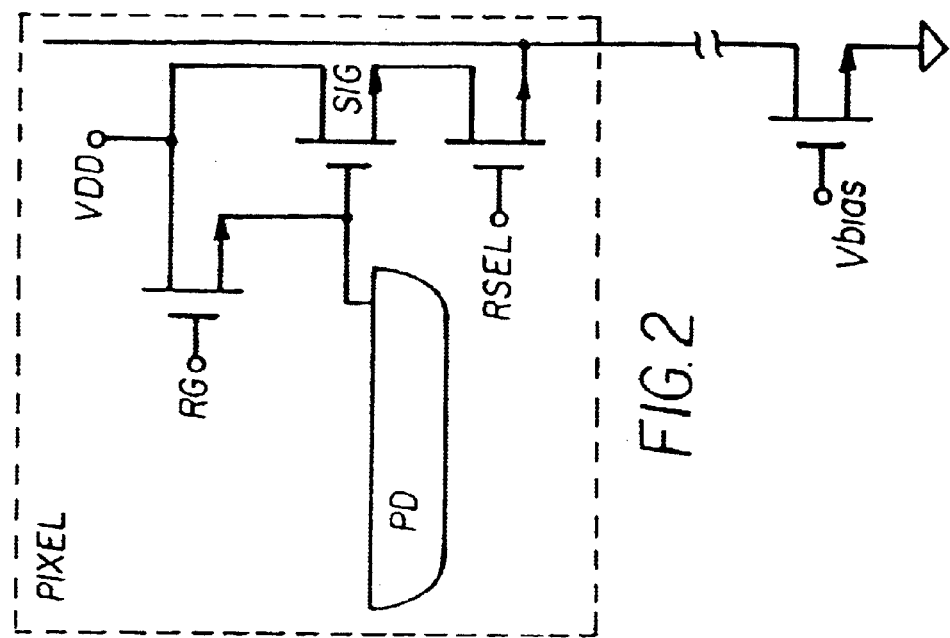
FIG. 2 is a schematic diagram of a second active pixel sensor pixel.

This problem is more severe for the APS pixel shown in FIG. 2. In this case the photodiode also functions as the charge to voltage conversion node, and its diode capacitance comprises a much larger portion of the total capacitance associated with electrical node of the gate of the source follower input transistor. In this case the first portion of the pixel response transfer curve 33 is much smaller than that for the case the case of the APS pixel shown in FIG. 1.

The invention mitigates these problems by reducing the percentage of the voltage-dependent capacitance compared with the total capacitance associated with the charge to voltage conversion node. More specifically, the invention reduces the percentage of the voltage-dependent capacitance by including a larger voltage-independent capacitance connected to the charge to voltage conversion node.

Figure 4A:
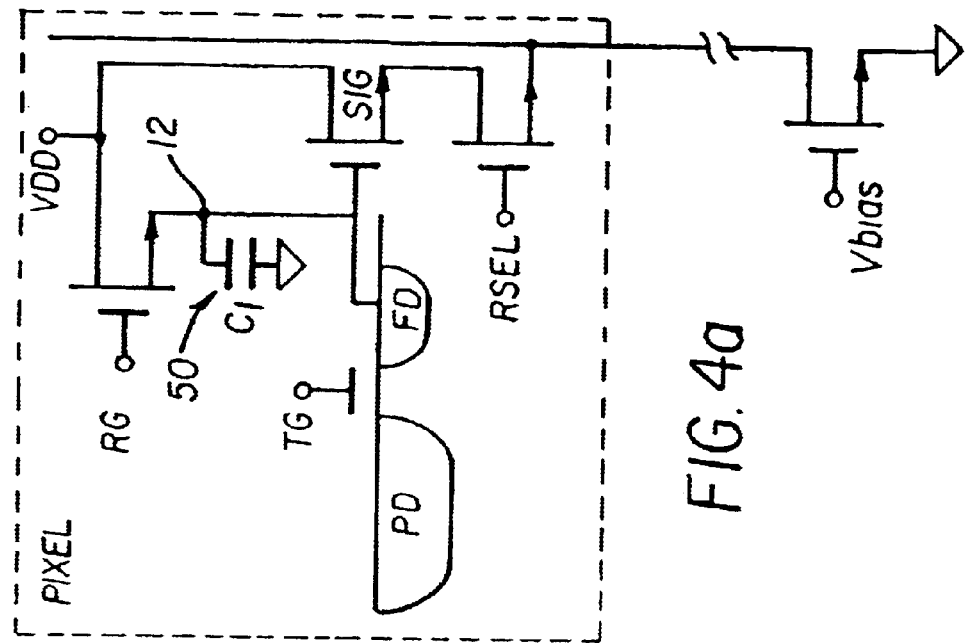
FIG. 4a is a schematic diagram of an active pixel sensor utilizing a voltage-independent capacitor.
Figure 4B:
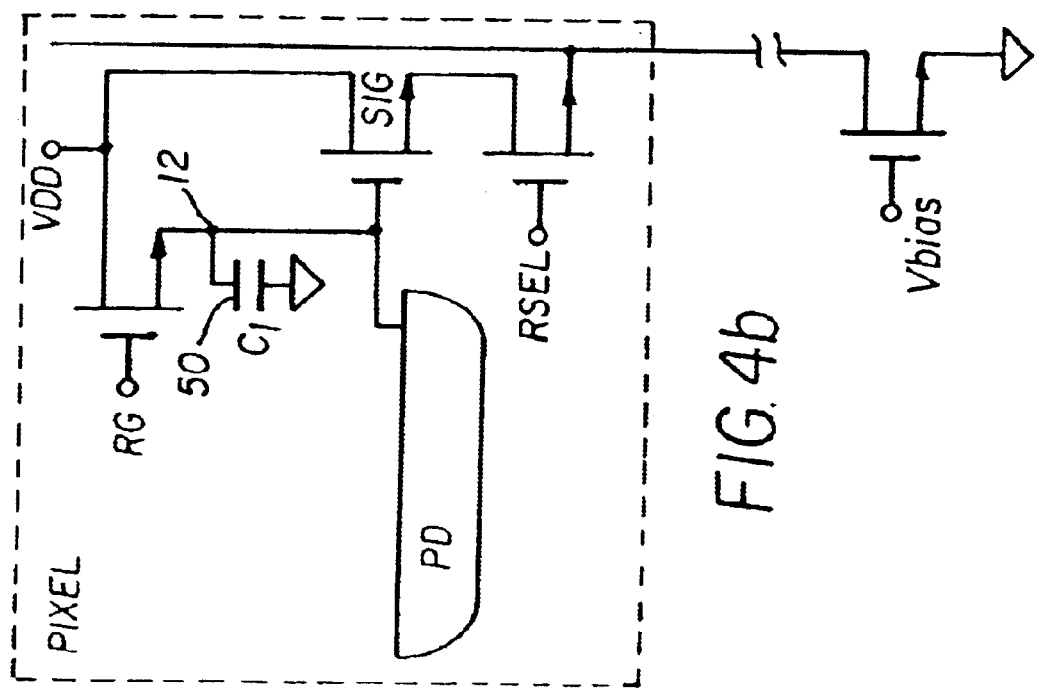
FIG. 4b is a schematic diagram of an active pixel sensor utilizing a voltage-independent capacitor.

For example, in one embodiment, (shown in FIGS. 4a and 4b), a capacitor $C_1$ 50 is connected to the charge to voltage conversion node 12. The capacitor $C_1$ 50 is selected to have a very low voltage coefficient to provide linearity and charge capacity for the reasons stated above. More specifically, by adding additional non-voltage-dependent capacitance, the linearity and saturation voltage is increased. In a preferred embodiment the capacitor 50 comprises a polysilicon-polysilicon or other electrode-electrode capacitor. Such capacitors exhibit very low voltage coefficients and provide a capacitance that is independent of the voltage on the sensing node 12.

The dotted line B in FIG. 3 illustrates the pixel response transfer function achieved by adding a voltage-independent capacitance in parallel with the floating diffusion. The first portion of the transfer function (portion 32) that does not deviate from a defined level of linearity, is increased compared to the prior art. Although the Vsat has decreased, since a fixed number of maximum electrons from the photodetector are converted to a voltage by a larger capacitance, the useful linear signal level Vsat', and linear signal transfer function 32, can be increased, while the second non-linear portion 31 is decreased.

Further, with the inventive structure, the overall charge capacity of the sensing node is increased, which is useful for cases where a large pixel and large photodetector are required.

Thus, as discussed above, with the inventive structure, the linear signal response (e.g., portion 32) of the APS is dramatically increased because the overall voltage dependency capacitance of the cell is reduced by adding voltage-independent capacitance device(s).

In addition, as would be known by one ordinarily skilled in the art, a combination of devices can be used to add voltage-independent capacitance to the APS. For example, multiple capacitors 50 could be used to achieve the necessary level of capacitance.

Figure 5A:
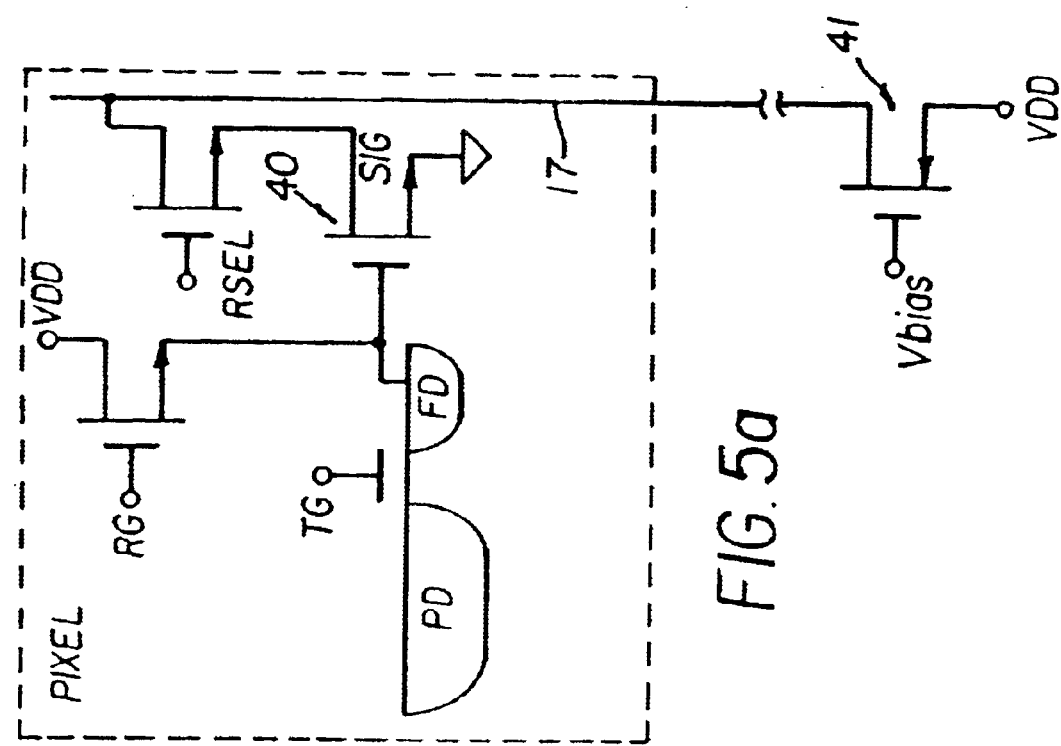
FIG. 5a is a schematic diagram of an active pixel sensor pixel utilizing a common source amplifier.

In another embodiment the invention utilizes a common source amplifier 40 as the readout mechanism, rather than the source follower 15 (e.g., see FIG. 5a and 5b). The load for the common source amplifier 40 is shown as item 41 along the column bus 17.

The input capacitance of a common source amplifier can be made larger than that of a source follower amplifier by designing the common source amplifier voltage gain to be greater than 1. The input capacitance of the common source amplifier 40 is preferably larger than that of the source follower amplifier so that the sense node junction capacitance is a smaller component of the overall capacitance of the sense node to improve linearity, and so the total capacitance is larger to provide larger charge capacity on the sense node.

As would be known by one ordinarily skilled in the art given this disclosure, the input capacitance of the common source amplifier 40 can be made (selected) larger by designing the common-source amplifier voltage gain to provide the desired Miller effect on the gate-drain capacitance and the gate-channel capacitance of the pixel input transistor.

Additionally, a combination of the common source amplifier 40 and one or more capacitors 50 could be used to achieve the reduction in the percentage of the of voltage-dependent capacitance of the sense node, and the corresponding increase in linear signal response discussed above.

In addition the capacitor $C_1$ could be comprise a capacitance to a node other than ground, such as VDD.

Thus, the invention produces a greater linear signal response (e.g., portion 32) to light levels and has a higher voltage saturation level $V_{sat2}$ because the voltage dependent capacitance of the cell is reduced by adding voltage-independent capacitance devices (40, 50).

While the invention has been described in terms of preferred embodiments, those skilled in the art will recognize that the invention can be practiced with modification within the spirit and scope of the appended claims.

| PARTS LIST | |
|---|---|
| 5 | CMOS active pixel sensor cell |
| 10 | Photodiode |
| 11 | Transfer transistor |
| 12 | Floating diffusion region (FD) |
| 13 | Reset transistor |
| 14 | Voltage supply VDD |
| 15 | Input transistor (source-follower) |
| 16 | Row select transistor |
| 17 | Column bus |
| 30 | Second portion |
| 31 | Second portion |
| 32 | Transfer function (first portion) |
| 33 | Useable signal range (first portion) |
| 40 | Common source amplifier |
| 41 | Item |
| 50 | Capacitors |
| A | Solid line |
| B | Dotted line |
| TG | Transfer gate |
| RG | Reset gate |

What is claimed is:

1. An active pixel image sensor comprised of a plurality of pixels, at least one pixel comprising:

a photodetector;

a transistor;

a charge to voltage conversion region coupled to said photodetector and connected to the input of said transistor; and a capacitor connected in parallel with the charge to voltage conversion region wherein the capacitor is designed to have a low voltage coefficient.

2. The device in claim 1, wherein said capacitor provides a capacitance independently of a voltage on said charge to voltage conversion node.

3. The device in claim 1, wherein said capacitor comprises a polysilicon to polysilicon double plate capacitor.

4. The device in claim 1, wherein said capacitor comprises a polysilicon to metal interconnect double plate capacitor.

5. The device in claim 1, wherein said capacitor comprises a metal interconnect to metal interconnect double plate capacitor.

6. An active pixel image sensor comprised of a plurality of pixels, at least one pixel comprising:

a photodetector;

a transistor;

said photodetector also operating as a charge to voltage conversion region connected to the input of said transistor; and a capacitor connected in parallel with photodetector wherein the capacitor is designed to have a low voltage coefficient.

7. The device in claim 6, wherein said capacitor provides a capacitance independently of a voltage on said charge to voltage conversion node.

8. The device in claim 6, wherein said capacitor comprises a polysilicon to polysilicon double plate capacitor.

9. The device in claim 6, wherein said capacitor comprises a polysilicon to metal interconnect double plate capacitor.

10. The device in claim 6, wherein said capacitor comprises a metal interconnect to metal interconnect double plate capacitor.

11. An active pixel image sensor comprised of a plurality of pixels, at least one pixel comprising:

a photodetector;

a transistor;

a charge to voltage conversion region coupled to said photodetector and connected to the input of said transistor;

wherein said transistor is configured to operate as a common source amplifier; and a capacitor connected in parallel with the charge to voltage conversion region wherein the capacitor is designed to have a low voltage coefficient.

* * * * *